United States Patent [19]

Silva et al.

[11] 4,025,699

[45] May 24, 1977

[54] MANGANESE STORAGE BATTERY

[76] Inventors: Lou Silva, c/o George Spector, 3615 Woolworth Bldg., 233 Broadway; George Spector, 3615 Woolworth Bldg., 233 Broadway, both of, New York, N.Y. 10007

[22] Filed: Nov. 24, 1975

[21] Appl. No.: 634,521

[52] U.S. Cl. .............................. 429/72; 429/81; 429/188; 429/229; 429/208

[51] Int. Cl.² .................................. H01M 10/04

[58] Field of Search ............... 136/6 R, 20, 30, 3, 136/121, 125, 138, 154, 159, 160, 79–81; 429/14, 51, 67, 72, 81, 188, 229, 186, 208

[56] References Cited

UNITED STATES PATENTS

| 2,670,395 | 2/1954 | Audubert et al. ............... 136/136 |
| 3,530,496 | 9/1970 | Amano ............................. 136/30 |

*Primary Examiner*—Anthony Skapars

[57] ABSTRACT

An improved storage battery which is composed of carbon and zinc plates having separators therebetween, the zinc plates being left untreated while the carbon plates are treated with manganese dioxide. Wherein the plates are pivotally suspended and perforated for better circulation of the electrolyte solution.

9 Claims, 5 Drawing Figures

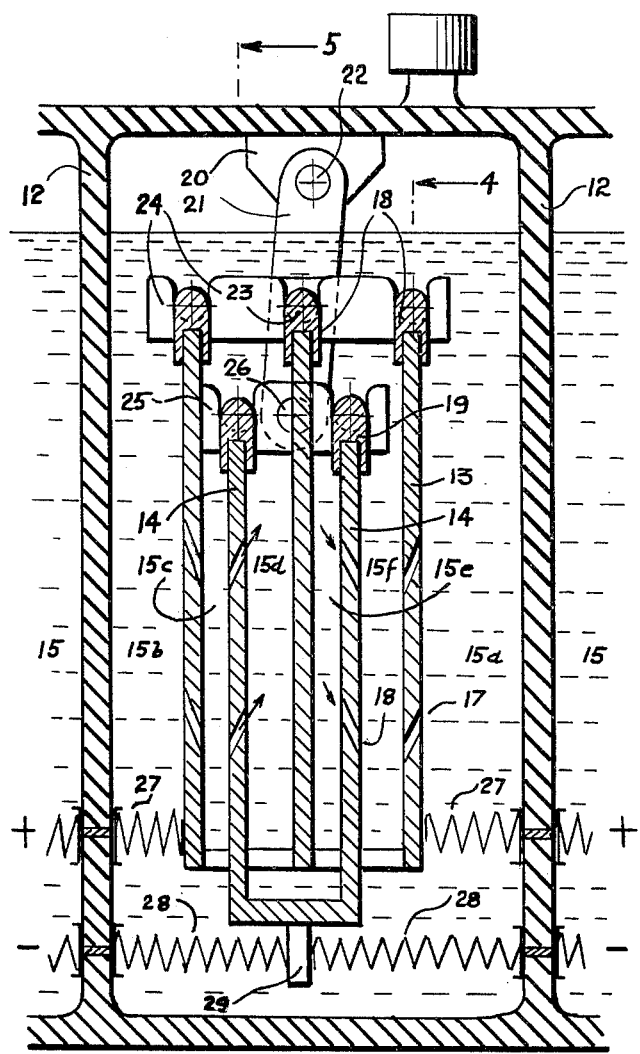
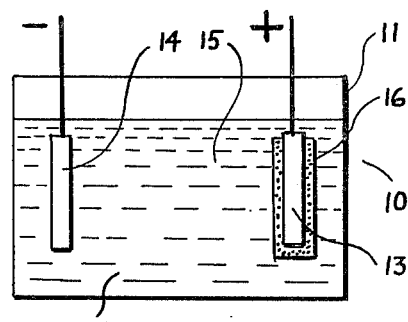
FIG.1
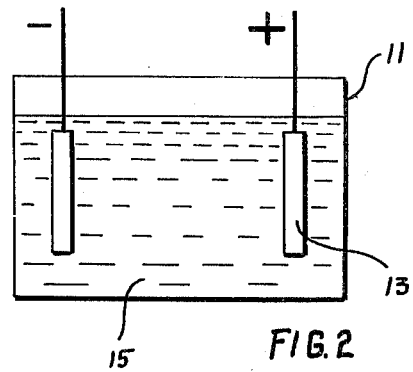
FIG.2
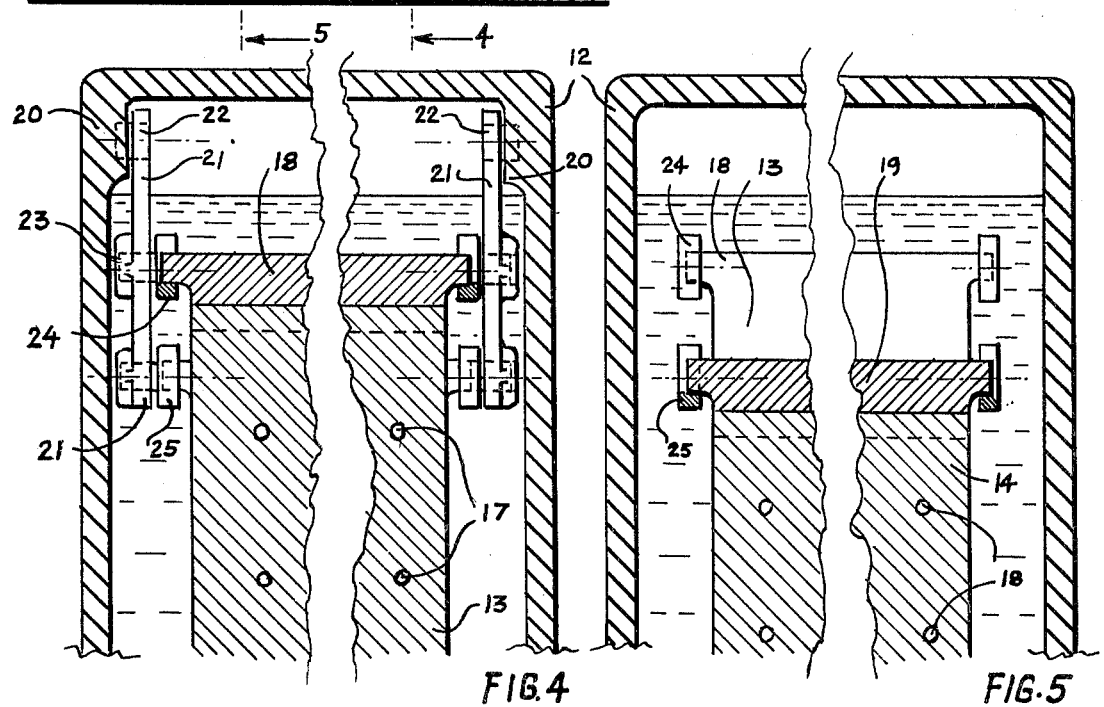

MANGANESE STORAGE BATTERY

This invention relates generally to electric storage batteries.

A principle object of the present invention is to provide a power plant that forms a secondary battery in which the reaction is an all manganese one.

Another object is to provide a manganese storage battery that is unlike a primary cell wherein the active zinc metal is used up and cannot be recharged.

Another object is to provide a manganese storage battery wherein the zinc is not used but remains untouched.

Another object is to provide a manganese storage battery which when being charged, deposits manganese dioxide from the electrolyte on to the positive carbon plate so to increase the power and efficiency of the positive electrodes.

Other objects are to provide a manganese storage battery which is simple in design, inexpensive to manufacture, rugged in construction, easy to use and efficient in operation.

These and other objects will be readily evident upon a study of the following specification and the accompanying drawing wherein:

FIG. 1 is a diagram of the invention shown charged.

FIG. 2 is a diagram thereof shown discharged.

FIG. 3 is a cell of a battery showing a modified design of the invention which includes the features illustrated in FIGS. 1 and 2, and which additionally includes the feature of the plates to be slidable in the cell forwardly and rearwardly due to a stop and go force of the vehicle, so to better allow circulation of the electrolyte through diagonal slits through the electrodes for a more efficient electrolysis action.

FIG. 4 is a partial sectional view of the battery through 4—4 of FIG. 3.

FIG. 5 is a similar section through 5—5 of FIG. 3.

Referring now to the drawing in detail, and more particularly to FIGS. 1 and 2, the reference numeral 10 represents a manganese storage battery according to the present invention that includes a battery case 11 divided into cells 12, each cell containing positive carbon plates 13 and negotive zinc plates 14 having separators (not shown) therebetween. The battery contains a liquid electrolyte 15 which, in the charged battery, comprises manganous hydroxide and water. When the battery is being charged, a manganese dioxide 16 from the electrolyte is deposited on the carbon plate 13 so to form a thick deposit thereof, as shown in FIG. 1.

In the present invention electrolysis is used so to thus build up the manganese dioxide on the carbon plate. This resuls in increased power and efficiency of the positive electrodes.

It is to be noted that in a primary cell using manganese dioxide as a depolarizer, the manganese dioxide is placed in contact only with the positive carbon electrode.

The reason for treating the positive carbon electrode is that new carbon is difficult to oxidize. Once a deposit of manganese dioxide is built up on the positive carbon electrode, the electrode is then ready for operative use in the battery.

Thus there is provided an improved storage battery.

FIG. 3 shows one of the cells 12 of the battery 10 with details of an alternative mode of suspending the electrodes in the cell, 20 is a thickened portion of cell wall 11 (see also FIG. 4) and is formed to pivot a pin 22 riveted to an arm 21 made of any metal alloy imprevious to the electrolyte, or of suitable plastics, This suspension arm carries two levers, 24 and 25, in such a manner that they may swing independently, around pivots 23 and 26 respectively.

The levers 24 and 25 have slots equi-distant with the space between electrode plates of the same polarity.

For example the electrode plate 13 is fastened to a holding bar 18 (FIGS. 3 and 4) whose extensions on each side fit into said slots of levers 24.

Similarly, holding bar 19 (FIGS. 3 and 5) fits at both ends into slots in of levers 25.

It is evident therefore that each electrode group within a cell is independently suspended from a pair of levers (24 —24, 25 —25) which in turn pivot independently in suspension arm 21.

The lower portions of the electrodes are prevented from swinging at large amplitudes by buffer springs 27—27, and 28—28 respectively,; the same may simultaneously be used as electronical conductors from duct to the electrodes. Actual connections depend on whether cells work in paralell or series. In FIG. 3 it is assumed that cells work in paralell.

The position of lever 21 in FIG. 3 is off the normal perpendicular to illustrate what happens when the vehicle moving from right to left applies the brakes,. The electrodes swing towards the left and in the process alter the previously equi distant spacing between the neighboring electrode plates. This change in volume between the plates causes a forceful displacement of the electrolyte; some of this displacement passes through holes 17 and 18 respectively in the electrode plates.

Holes may be at an angle so as further add to the circulative effect,

The springs 27, 28 will introduce displacements as well but at a higher frequency.

The combined resulting movement of the electrodes will tend to disperse local concentrations of the electrolyte, and thereby eliminate one of the causes of battery inefficiency.

By making the holes 17, 18 in the battery electrodes a conical (instead of cylindrical) a pumping action in one direction would be obtained, which may still further improve the circulation of the electrolyte within the cell and thereby its full utilization.

While various changes may be made in the detail construction it is to be noted that such changes will be within the spirit and scope of the present invention, as is defined by the appended claims.

What is claimed is:

1. In a manganese storage battery a battery case divided into a plurality of cells, zinc negative plates and carbon positive plates with separators therbetween being in each said cell, said plates being connected electrically to exterior battery terminal posts, and an electrolyte comprised of manganous hydroxide and water.

2. The combination as set forth in claim 1 wherein, when battery is charged, a manganese dioxide from said electrolyte is deposited on said carbon plates.

3. The combination as set forth in claim 2 wherein means are provided for permitting electrodes to move relative to the walls of the battery responsive to inertial forces such as change of vehicle speed or vibrations.

4. The combination as set forth in claim 3 wherein further means are provided for causing the displacement of adjacent electrodes to be unequal so that in the process the distance between adjacent electrodes transitionally varies causing the electrolite to be forcefully moved.

5. The combination as set forth in claim 2 wherein the electrodes have holes to improve electrolyte circulation.

6. The combination of claim 5 wherein the holes are at an acute angle to the surface of the electrode plate.

7. The combination of claim 6 wherein the cross sectional shape of the holes is conical.

8. The combination as set forth in claim 4 wherein one of the means for permitting electrodes to move is a pivoted suspension arm into which the two groups of electrodes are hinged at unequal distances from the pivot point of said arm.

9. The combination as set forth in claim 5 wherein means for limiting the initial displacement of said hinged electrodes are provided, which means also serve the elastic conductive connection between electrodes and external terminals.

* * * * *